United States Patent
Akamatsu et al.

(10) Patent No.: US 6,884,512 B2
(45) Date of Patent: Apr. 26, 2005

(54) ARTICLE SUPERIOR IN MAKING WATERDROPS SLIP DOWN SURFACE THEREOF AND PROCESS FOR PRODUCING SUCH ARTICLE

(75) Inventors: Yoshinori Akamatsu, Mie (JP); Soichi Kumon, Mie (JP); Kaname Hatakenaka, Mie (JP); Haruki Kuramashi, Mie (JP); Hiroaki Arai, Mie (JP); Shigeo Hamaguchi, Mie (JP)

(73) Assignee: Central Glass Company, Limited, Ube (JP)

( * ) Notice: Subject to any disclaimer, the term of this patent is extended or adjusted under 35 U.S.C. 154(b) by 10 days.

(21) Appl. No.: 10/628,566

(22) Filed: Jul. 29, 2003

(65) Prior Publication Data

US 2004/0076840 A1 Apr. 22, 2004

(30) Foreign Application Priority Data

| Jul. 30, 2002 | (JP) | 2002-220665 |
|---|---|---|
| Feb. 18, 2003 | (JP) | 2003-040237 |
| Feb. 18, 2003 | (JP) | 2003-040238 |
| Apr. 17, 2003 | (JP) | 2003-113085 |
| May 30, 2003 | (JP) | 2003-155171 |

(51) Int. Cl.$^7$ .............................................. B32B 9/04
(52) U.S. Cl. ............. 428/447; 106/287.13; 106/287.16; 427/387; 528/34; 528/39; 528/42
(58) Field of Search ............... 106/287.13, 287.16; 428/447; 528/34, 39, 42

(56) References Cited

U.S. PATENT DOCUMENTS

| 3,579,540 A | | 5/1971 | Ohlhausen | |
|---|---|---|---|---|
| 5,514,741 A | * | 5/1996 | Arai et al. | 524/437 |
| 5,739,369 A | | 4/1998 | Matsumura et al. | |
| 6,403,225 B1 | * | 6/2002 | Narisawa et al. | 428/429 |

FOREIGN PATENT DOCUMENTS

| EP | 0738771 | 7/2001 | | |
|---|---|---|---|---|
| JP | 5-301742 | 11/1993 | | |
| JP | 62-62943 | 9/1994 | | |
| JP | 8-12375 | 1/1996 | | |
| JP | 8-268234 | 10/1996 | | |
| JP | 11-181412 | 7/1999 | | |
| JP | 2000-26758 | 1/2000 | | |
| JP | 2000-144056 | 5/2000 | | |
| JP | 2001172417 A | * | 6/2001 | C08J/7/04 |

OTHER PUBLICATIONS

Taiwanese Office Action.

* cited by examiner

Primary Examiner—Margaret G. Moore
Assistant Examiner—Marc Zimmer
(74) Attorney, Agent, or Firm—Crowell & Moring LLP

(57) ABSTRACT

The invention relates to an article superior in making a waterdrop slip down a surface of the article. This article includes a substrate; and a functional film formed on a surface of the substrate. This functional film contains: (a) a silica forming a matrix of the functional film; (b) a silylated-terminal dimethyl silicone represented by the general formula [A], the dimethyl silicone being in an amount of from 0.1 wt % to 10 wt %, based on a total weight of the silica; and (c) a fluoroalkylsilane represented by the general formula [B]

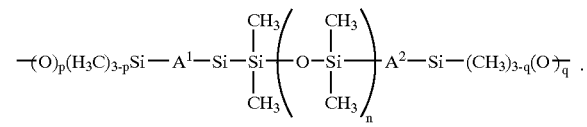

16 Claims, 1 Drawing Sheet

FIGURE
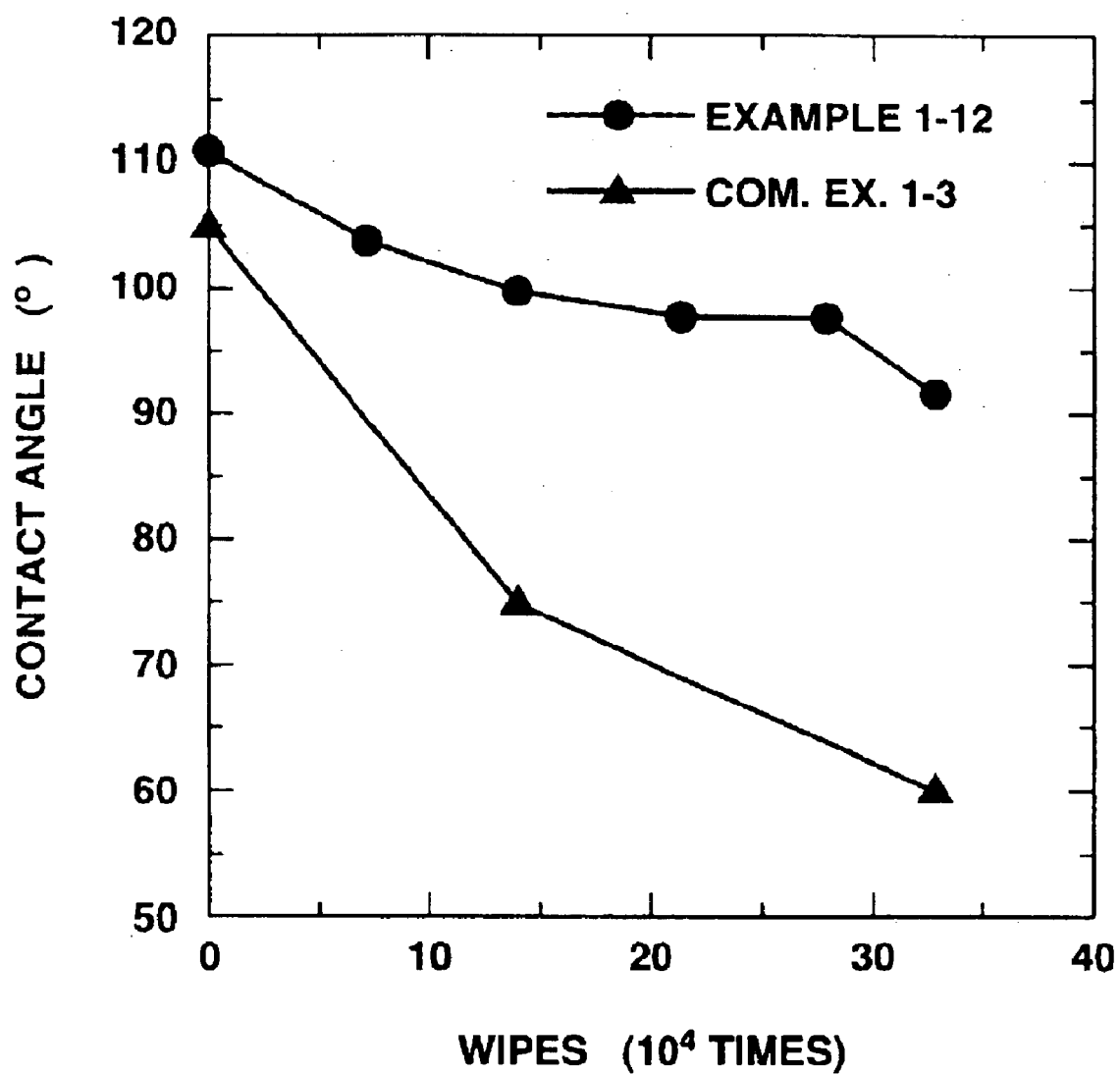

ARTICLE SUPERIOR IN MAKING WATERDROPS SLIP DOWN SURFACE THEREOF AND PROCESS FOR PRODUCING SUCH ARTICLE

BACKGROUND OF THE INVENTION

The present invention relates to an article having a functional (waterdrop slippage capable) film superior in making waterdrops slip down the surface of the article. This article can be used for architectural and vehicular windowpanes, mirrors, and industrial glasses.

Various compositions (including silicone waxes, organopolysiloxanes, and surfactants) have been proposed in the course of improving waterdrop slippage capability.

U.S. Pat. No. 3,579,540, corresponding to Japanese Patent Examined Publication JP-B-50-15473, discloses a water repellent composition containing an alkylpolysiloxane and a mineral acid.

Japanese Patent Unexamined Publication JP-A-5-301742 discloses a water repellent agent for automotive window glass. This water repellent agent contains an amino-modified silicone oil and a surfactant.

JP-A-11-181412 discloses a surface treating agent containing a component that is a fluorine-containing silicone compound and/or its partial hydrolysate. This component contains a first essential unit in which a group (e.g., —(CH$_2$)$_3$(CF$_2$)$_7$CH$_3$ and —(CH$_2$)$_3$(CF$_2$)$_7$CF$_3$) is directly bonded to a silicon atom of an organosiloxane unit, and a second essential unit in which a group (e.g., —(CH$_2$)$_3$SiCl$_3$) is directly bonded to a silicon atom of an organosiloxane unit.

JP-A-2000-144056 discloses a surface treating liquid that is a mixture of (a) a first or second silicone compound, (b) an acid, and (c) a solvent containing water dissolved therein. The first silicone compound has a hydrolysable functional group at its end. The second silicone compound has a hydrolysable functional group at one end and a fluoroalkyl group at the other end.

JP-A-8-12375 discloses a water-repellent article prepared by applying a coating solution to a substrate. This coating solution is prepared by mixing together (a) a first solution obtained by hydrolyzing in a solvent a fluoroalkyl-group-containing silane compound and another compound (polydimethylsiloxane and/or polydimethylsiloxane derivative) and (b) a second solution obtained by hydrolyzing in a solvent an alkoxysilane compound.

JP-A-2000-26758 discloses a coating composition containing as essential components (A) hydroxyl-group-containing vinyl polymer, (B) an epoxy-terminated siloxane polymer, (C) a sulfonic acid compound, (D) a crosslinking agent component, and (E) a surfactant.

JP-A-6-262943 discloses an automotive windshield system having a two-layer-coated front windshield and a resin-coated windshield wiper.

JP-A-8-268234 discloses an automotive windshield wiper system with a pressure regulator for regulating the wiper pressure against a front windshield.

SUMMARY OF THE INVENTION

It is an object of the present invention to provide an article that is superior in making waterdrops slip down the surface of the article and in wear resistance against the windshield wiper movement.

It is another object of the present invention to provide a process for producing the article.

According to the present invention, there is provided an article superior in making a waterdrop slip down a surface of the article. This article comprises a substrate and a functional film formed on a surface of the substrate. This functional (waterdrop slippage capable) film comprises:

(a) a silica forming a matrix of the functional film;

(b) a silylated-terminal dimethyl silicone represented by the general formula [A] the dimethyl silicone being in an amount of from 0.1 wt % to 10 wt %, based on a total weight of the silica; and (c) a fluoroalkylsilane represented by the general formula [B],

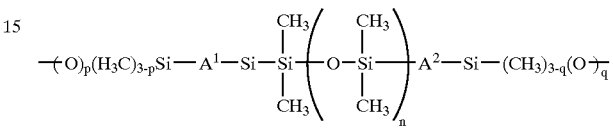

where each of A$^1$ and A$^2$ is independently a bivalent hydrocarbon group, —(CH$_2$)$_i$—NH—COO— group, where i is an integer of from 0 to 9, or oxygen; n is an integer of 2,000 or less and represents an average degree of polymerization; each of p and q is independently an integer of from 0 to 3; a total of p and q is 3 or greater; and each of terminal oxygens is independently bonded to a unit that is different from the dimethyl silicone or to another unit that is identical with the dimethyl silicone,

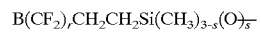

[III]

where B represents —CF$_3$ group or —CH$_2$CH$_2$Si(CH$_3$)$_{3-t}$(O—)$_t$ group, where t is an integer of from 1 to 3; r is an integer of from 0 to 12; s is an integer of from 1 to 3; and a terminal oxygen is bonded to a unit that is different from the fluoroalkylsilane or to another unit that is identical with the fluoroalkylsilane.

According to the present invention, there is provided a first process for producing the above article. The first process comprises the steps of:

(a) mixing a silica precursor sol with (i) an alkoxy-group-terminated dimethyl silicone that is represented by the general formula [1] and that is in an amount of from 0.1 wt % to 10 wt %, based on a total weight of a silica that is to be produced from the silica precursor sol and (ii) a fluoroalkylsilane represented by the general formula [2], such that the alkoxy-group-terminated dimethyl silicone and the fluoroalkylsilane are subjected to hydrolysis and polycondensation to form a polycondensation product and such that a coating solution containing a mixture of the silica precursor sol and the polycondensation product is prepared; and (b) applying the coating solution to a substrate,

[1]

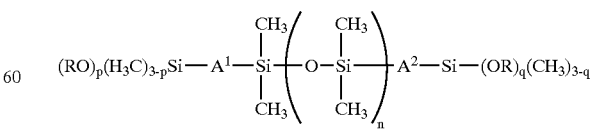

where each of A$^1$ and A$^2$ is independently a bivalent hydrocarbon group, —(CH$_2$)$_i$—NH—COO— group, where i is an integer of from 0 to 9, or oxygen; R is a monovalent hydrocarbon group; n is an integer of 2,000 or less and represents an average degree of polymerization; each of p and q is independently an integer of from 0 to 3; and a total of p and q is 3 or greater,

 [2]

where B represents —CF$_3$ group or —CH$_2$CH$_2$Si(CH$_3$)$_{3-t}$Y$_t$ group, where Y represents a hydrolysable group and t is an integer of from 1 to 3; X represents a hydrolysable group; r is an integer of from 0 to 12; and s is an integer of from 1 to 3.

According to the present invention, there is provided a second process for producing the article. The second process comprises the steps of:

(a) subjecting an alkoxysilane to hydrolysis and polycondensation, thereby preparing a silica precursor sol;

(b) subjecting an alkoxy-group-terminated dimethyl silicone represented by the general formula [1] and a fluoroalkylsilane represented by the general formula [2] to hydrolysis and polycondensation, thereby preparing a polycondensation product;

(c) mixing the silica precursor sol with the polycondensation product, thereby preparing a coating solution; and (d) applying the coating solution to a substrate.

BRIEF DESCRIPTION OF THE DRAWINGS

FIGURE is a graph showing the contact angle changes of a waterdrop in the wiper wear test of Example 1-12 and Comparative 1-3.

DESCRIPTION OF THE PREFERRED EMBODIMENTS

The present invention was made in view of the above problems. The present inventors eagerly examined functional films (i.e., highly waterdrop slippage capable films), in which a dimethyl silicone of a waterdrop slippage capable component and a fluoroalkylsilane for providing durability are contained, and developed a functional film that is colorless and transparent and that is superior in waterdrop slippage capability and durability, particularly in mud water abrasion resistance and wear resistance by wipers and the like.

In case that the above article (article superior in making waterdrops slip down surface thereof; i.e., highly waterdrop slippage capable article) is used as a vehicular windshield, it is needless to say that the highly waterdrop slippage capable film is wiped with a wiper to remove the waterdrops.

The above article (highly waterdrop slippage capable article) can be produced by the above first or second process. The total amount of the silica in the first or second process refers to the amount of silica that is obtained from a silica precursor sol (hereinafter "silica sol") and is univocally derived from the amount of an alkoxysilane that is the starting material of the silica sol.

The silylated-terminal dimethyl silicone represented by the general formula [A] of the functional film is derived from an alkoxy-group-terminated dimethyl silicone (represented by the general formula [1]) used in the first or second process. The fluoroalkylsilane represented by the general formula [B] of the functional film is derived from a fluoroalkylsilane (represented by the general formula [2]) used in the first or second process.

It is preferable that the average degree of polymerization n in the general formula [A] or [1] is particularly 5–1,000.

The alkoxy-group-terminated dimethyl silicone of the general formula [1] contains an alkoxy group at the terminal. Therefore, hydrolysis and polycondensation occur at the alkoxy group site, when the functional film is formed, and it can chemically be bonded with the silica as the matrix.

The fluoroalkylsilane of the general formula [2] contains a hydrolysable group at the terminal. Therefore, hydrolysis and polycondensation occur at the hydrolysable group site, when the functional film is formed, and it can chemically be bonded with the silica as the matrix.

In the first process, the functional film of the present invention is produced from a coating solution that has been prepared by mixing the alkoxy-group-terminated dimethyl silicone, which becomes a waterdrop slippage capable component, and the fluoroalkylsilane, which becomes a durability-providing component, with the silica sol, which becomes the silica matrix. When the film is formed from the coating solution, hydrolysis and polycondensation occur at the alkoxy group site of the alkoxy-group-terminated dimethyl silicone and the hydrolysable group site of the fluoroalkylsilane. Therefore, the alkoxy-group-terminated dimethyl silicone and the fluoroalkylsilane are chemically bonded with the silica matrix.

The silica as the matrix that is a component constituting the functional film is obtained from the silica sol, which is formed by conducting hydrolysis and polycondensation of the alkoxysilane. To prepare the silica sol, for example, an alkoxysilane (e.g., tetraethoxysilane [Si(OC$_2$H$_5$)$_4$]) and a solvent are mixed together in predetermined amounts, followed by stirring (e.g., about 30 min), thereby obtaining solution A. As the solvent, a lower alcohol such as ethyl alcohol and isopropyl alcohol or a mixed solvent thereof is desirable. It is, however, not limited to alcohols, and it is possible to use ethers and ketones, too. On the other hand, an acid aqueous solution and the solvent are mixed together, followed by stirring, thereby obtaining solution B. Then, the solution A and the solution B are mixed together, followed by stirring at room temperature to conduct hydrolysis and polycondensation of the alkoxysilane, thereby obtaining the silica sol. The stirring time is preferably from 10 min to several days, particularly preferably from 30 min to one day. It is, however, not limited to this in case that the stirring is conducted at a temperature except room temperature. As mentioned above, it is possible to conduct hydrolysis of the alkoxysilane by using the alkoxysilane as a starting material and by adding a small amount of water and an acid catalyst such as hydrochloric acid, nitric acid and acetic acid. It is possible to obtain a silica sol by stirring the hydrolysate at room temperature or under heating to achieve the polycondensation. Although the process for preparing the silica sol is not limited to the above process, the above process, in which one prepared by diluting the alkoxysilane with a solvent is gradually mixed with an acid aqueous solution prepared by dilution with a solvent, can prevent an abrupt reaction and can obtain a more homogeneous reaction. Therefore, it is preferable.

As the alkoxysilane, it is possible to use tetraalkoxysilanes such as tetramethoxysilane, tetraethoxysilane, tetrapropoxysilane, and tetrabutoxysilane, trialkoxysilanes such as methyltriethoxysilane, methyltrimethoxysilane, ethyltrimethoxysilane, ethyltriethoxysilane, propyltrimethoxysilane and propyltriethoxysilane, or dialkoxysilanes. Of the above alkoxysilanes, tetramethoxysilane, tetraethoxysilane, and trialkoxysilanes such as methyltriethoxysilane, methyltrimethoxysilane, ethyltrimethoxysilane, and ethyltriethoxysilane are preferable.

It is important that the number (p+q) of the alkoxy groups, which is owned by the alkoxy-group-terminated dimethyl silicone represented by the general formula [1] to be mixed with the silica sol, is 3 or greater. If the number of the alkoxy groups of the hydrolysable groups is less than 3, the solubility in the silica sol, which turns into the silica matrix component obtained by hydrolysis and polycondensation of the alkoxysilane, decreases, thereby lowering the film forming capability. Furthermore, the bonding between the alkoxy-group-terminated dimethyl silicone and the silica, which is a matrix component of the film, becomes insufficient, thereby significantly lowering durability of the functional film. Therefore, the total number (p+q) of the alkoxy groups must be 3 or greater.

In the first or second process, it is important that the alkoxy-group-terminated dimethyl silicone represented by the general formula [1] is mixed in an amount of 0.1 wt % to 10 wt %, relative to the amount of the silica formed from the silica sol. With this, the dimethyl silicone content of the functional film becomes 0.1 wt % to 10 wt %, based on the total amount (100 wt %) of the silica. If it is less than 0.1 wt %, the film does not show a sufficient waterdrop slippage capability. If it exceeds 10 wt %, its compatibility with the silica sol lowers, and the film forming capability lowers significantly. Furthermore, if the average degree of polymerization n of the alkoxy-group-terminated dimethyl silicone, represented by the general formula [1], or the dimethyl silicone, represented by the general formula [A], exceeds 2,000, its solubility in the silica sol lowers significantly, and insoluble matters, which are difficult for separation, remain, thereby significantly lowering the film forming capability. Therefore, it must be 2,000 or less, particularly preferably 5–1,000. If it is less than 5, volatility of the alkoxy-group-terminated dimethyl silicone becomes high, thereby making it difficult to be introduced into the functional film. On the other hand, if it is greater than 1,000, its compatibility with the silica sol becomes lower. Therefore, the average degree of polymerization is more preferably 1,000 or less.

In the first or second process, it is preferable that the fluoroalkylsilane represented by the general formula [2] is mixed in an amount of 3 wt % to 20 wt % relative to the total amount of the silica, which is formed from the silica sol. With this, the fluoroalkylsilane represented by the general formula [B] becomes 3 wt % to 20 wt % in the functional film of the present invention, based on the total weight (100 wt %) of the silica. If it is less than 3 wt %, the film lowers significantly in durability. If it exceeds 20 wt %, its compatibility with the silica sol, which becomes the matrix, lowers, and the film forming capability lowers significantly.

The concentration of the silica precursor, converted into the silica in the coating solution, may be 0.05–0.3 wt %.

In the functional film of the present invention, it is preferable that the fluoroalkylsilane represented by the general formula [B] is present in an amount of 20–200 moles relative to one mole of the silylated-terminal dimethyl silicone represented by the general formula [A]. Furthermore, in the first or second process, it is preferable that the fluoroalkylsilane represented by the general formula [2] is made to be present in an amount of 20–200 moles relative to one mole of the alkoxy-group-terminated dimethyl silicone. If it is less than 20 moles, the content of the fluoroalkylsilane is low relative to the alkoxy-group-terminated dimethyl silicone. Therefore, a durable film may not be obtained. Although it is possible to prevent the occurrence of judder upon the wiper sliding movement, the film exfoliation may occur by wiping with a wiper. If it exceeds 200 moles, the content of the fluoroalkylsilane becomes high relative to the alkoxy-group-terminated dimethyl silicone. With this, the waterdrop slippage capability may become inferior, and there may occur a malfunction in which judder occurs upon the wiper sliding movement.

As the fluoroalkylsilane represented by the above general formula [2], for example, it is possible to use fluoroalkylsilanes having a hydrolysable group at one terminal, such as $CF_3(CF_2)_{11}CH_2CH_2Si(OCH_3)_3$, $CF_3(CF_2)_{11}CH_2CH_2SiCH_3(OCH_3)_2$, $CF_3(CF_2)_{11}CH_2CH_2Si(CH_3)_2OCH_3$, $CF_3(CF_2)_9CH_2CH_2Si(OCH_3)_3$, $CF_3(CF_2)_9CH_2CH_2SiCH_3(OCH_3)_2$, $CF_3(CF_2)_9CH_2CH_2Si(CH_3)_2OCH_3$, $CF_3(CF_2)_7CH_2CH_2Si(OCH_3)_3$, $CF_3(CF_2)_7CH_2CH_2SiCH_3(OCH_3)_2$, $CF_3(CF_2)_7CH_2CH_2Si(CH_3)_2OCH_3$, $CF_3(CF_2)_5CH_2CH_2Si(OCH_3)_3$, $CF_3(CF_2)_5CH_2CH_2SiCH_3(OCH_3)_2$, $CF_3(CF_2)_5CH_2CH_2Si(CH_3)_2OCH_3$, $CF_3CH_2CH_2Si(OCH_3)_3$, $CF_3CH_2CH_2SiCH_3(OCH_3)_2$, $CH_3CH_2CH_2Si(CH_3)_2OCH_3$, $CF_3(CF_2)_{11}CH_2CH_2SiCl_3$, $CF_3(CF_2)_{11}CH_2CH_2SiCH_3Cl_2$, $CF_3(CF_2)_{11}CH_2CH_2Si(CH_3)_2Cl$, $CF_3(CF_2)_9CH_2CH_2SiCl_3$, $CF_3(CF_2)_9CH_2CH_2SiCH_3Cl_2$, $CF_3(CF_2)_9CH_2CH_2Si(CH_3)_2Cl$, $CF_3(CF_2)_7CH_2CH_2SiCl_3$, $CF_3(CF_2)_7CH_2CH_2SiCH_3Cl_2$, $CF_3(CF_2)_7CH_2CH_2Si(CH_3)_2Cl$, $CF_3(CF_2)_5CH_2CH_2SiCl_3$, $CF_3(CF_2)_5CH_2CH_2SiCH_3Cl_2$, $CF_3(CF_2)_5CH_2CH_2Si(CH_3)_2Cl$, $CF_3CH_2CH_2SiCl_3$, $CF_3CH_2CH_2SiCH_3Cl_2$, and $CF_3CH_2CH_2Si(CH_3)_2Cl$, and fluoroalkylsilanes having hydrolysable groups at both terminals, such as $(CH_3O)_3SiCH_2CH_2(CF_2)_{12}CH_2CH_2Si(OCH_3)_3$, $(CH_3O)_2CH_3SiCH_2CH_2(CF_2)_{12}CH_2CH_2SiCH_3(OCH_3)_2$, $CH_3O(CH_3)_2SiCH_2CH_2(CF_2)_{12}CH_2CH_2Si(CH_3)_2OCH_3$, $(CH_3O)_3SiCH_2CH_2(CF_2)_{10}CH_2CH_2Si(OCH_3)_3$, $(CH_3O)_2CH_3SiCH_2CH_2(CF_2)_{10}CH_2CH_2SiCH_3(OCH_3)_2$, $CH_3O(CH_3)_2SiCH_2CH_2(CF_2)_{10}CH_2CH_2Si(CH_3)_2OCH_3$, $(CH_3O)_3SiCH_2CH_2(CF_2)_8CH_2CH_2Si(OCH_3)_3$, $(CH_3O)_2CH_3SiCH_2CH_2(CF_2)_8CH_2CH_2SiCH_3(OCH_3)_2$, $CH_3O(CH_3)_2SiCH_2CH_2(CF_2)_8CH_2CH_2Si(CH_3)_2OCH_3$, $(CH_3O)_3SiCH_2CH_2(CF_2)_6CH_2CH_2Si(OCH_3)_3$, $(CH_3O)_2CH_3SiCH_2CH_2(CF_2)_6CH_2CH_2SiCH_3(OCH_3)_2$, $CH_3O(CH_3)_2SiCH_2CH_2(CF_2)_6CH_2CH_2Si(CH_3)_2OCH_3$, $(CH_3O)_3SiCH_2CH_2CF_2CH_2CH_2Si(OCH_3)_3$, $(CH_3O)_2CH_3SiCH_2CH_2CF_2CH_2CH_2SiCH_3(OCH_3)_2$, $CH_3O(CH_3)_2SiCH_2CH_2CF_2CH_2CH_2Si(CH_3)_2OCH_3$, $Cl_3SiCH_2CH_2(CF_2)_{12}CH_2CH_2SiCl_3$, $Cl_2CH_3SiCH_2CH_2(CF_2)_{12}CH_2CH_2SiCH_3Cl_2$, $Cl(CH_3)_2SiCH_2CH_2(CF_2)_{12}CH_2CH_2Si(CH_3)_2Cl$, $Cl_3SiCH_2CH_2(CF_2)_{10}CH_2CH_2SiCl_3$, $Cl_2CH_3SiCH_2CH_2(CF_2)_{10}CH_2CH_2SiCH_3Cl_2$, $Cl(CH_3)_2SiCH_2CH_2(CF_2)_{10}CH_2CH_2Si(CH_3)_2Cl$, $Cl_3SiCH_2CH_2(CF_2)_8CH_2CH_2SiCl_3$, $Cl_2CH_3SiCH_2CH_2(CF_2)_8CH_2CH_2SiCH_3Cl_2$, $Cl(CH_3)_2SiCH_2CH_2(CF_2)_8CH_2CH_2Si(CH_3)_2Cl$, $Cl_3SiCH_2CH_2(CF_2)_6CH_2CH_2SiC_3$, $Cl_2CH_3SiCH_2CH_2(CF_2)_6CH_2CH_2SiCH_3Cl_2$, $Cl(CH_3)_2SiCH_2CH_2(CF_2)_6CH_2CH_2Si(CH_3)_2Cl$, $Cl_3SiCH_2CH_2CF_2CH_2CH_2SiCl_3$, $Cl_2CH_3SiCH_2CH_2CF_2CH_2CH_2SiCH_3Cl_2$, and $Cl(CH_3)_2SiCH_2CH_2CF_2CH_2CH_2Si(CH_3)_2Cl$. Furthermore, as the hydrolysable groups represented by X and Y of the above general formula [2], it is possible to use alkoxy groups such as methoxy group, ethoxy group, propoxy group, isopropoxy group and butoxy group or chloro group and isocyanate group and the like.

In the first or second process, hydrolysis and polycondensation occur at the alkoxy group site of the alkoxy-group-terminated dimethyl silicone and at the hydrolysable group site of the fluoroalkylsilane. Therefore, when the functional film is formed, the silylated-terminal dimethyl silicone (represented by the general formula [A]) and the fluoroalkylsilane (represented by the general formula [B]) are chemically bonded with the silica as the matrix, thereby obtaining a film superior in durability. Upon this, it may be possible that an alkoxy group site and a hydrolysable group site, which are not chemically bonded with the silica matrix, are reacted with and bonded with an alkoxy group site of another alkoxy-group-terminated dimethyl silicone and a hydrolysable group site of a fluoroalkylsilane. The above dimethyl silicone and the above fluoroalkylsilane may be bonded with the silica matrix through another dimethyl silicone and another fluoroalkylsilane.

A functional film that prevents the occurrence of judder refers to one that is at the level at which chatter of a wiper blade does not occur upon wiping with a wiper, when a wiper blade is slidingly moved in a condition in which water has been scattered on the film by waterdrops, raindrops and the like, and at which there is no driving obstruction. It is possible to use a natural rubber-based one coated with fluororesin, nylon resin, polyisoimide or graphite, as a wiper rubber to be attached to the above wiper blade.

Furthermore, the film thickness of the functional film of the present invention is preferably from 10 nm to 100 nm. If it is less than 10 nm, in case that the substrate is a commonly used soda-lime silicate glass, durability lowers by the effect of diffusing components (such alkalis) present in the substrate. Therefore, it is not preferable. On the other hand, it is necessary to make the silica concentration in the coating solution high in order to obtain a film thickness exceeding 100 nm. By making the silica concentration in the coating solution high, the compatibility between the silica and the alkoxy-group-terminated dimethyl silicone or the fluoroalkylsilane lowers, and it becomes difficult to obtain a homogeneous film superior in transparency. Therefore, it is not preferable. In particular, it is an important point in the actual use as automotive windshields, which are required to have superior transparency. In the present invention, it is possible to make the film thickness of the functional film have a film thickness of from 10 nm to 30 nm by adjusting the silica concentration in the coating solution to 0.05 wt % to 0.3 wt %.

In the first process, it is possible to obtain the coating solution for the functional film by mixing the above silica sol, which becomes the silica matrix, with the alkoxy-group-terminated dimethyl silicone represented by the general formula [1] and the fluoroalkylsilane represented by the general formula [2], then by hydrolyzing the alkoxy-group-terminated dimethyl silicone and the fluoroalkylsilane, and then by bonding them with the silica sol through polycondensation. Upon this, it is preferable to previously mixing together the alkoxy-group-terminated dimethyl silicone and the fluoroalkylsilane, since it is possible to uniformly mix the both components in the coating solution.

The second process has the step of preparing a solution comprising a composition obtained by hydrolysis and polycondensation of the alkoxy-group-terminated dimethyl silicone represented by the general formula [1] and the fluoroalkylsilane represented by the general formula [2] and the step of obtaining a coating solution by mixing the solution with a solution comprising a composition obtained by hydrolysis and polycondensation of an alkoxysilane. With this, in a polycondensation product obtained by previously conducting hydrolysis and polycondensation of the alkoxy-group-terminated dimethyl silicone and the fluoroalkylsilane, a chemical bond therebetween becomes strong, and it can be provided with both characteristics of the dimethyl silicone, which is superior in waterdrop slippage capability, and the fluoroalkylsilane, which is superior in water repellency and durability. In addition, the polycondensation product becomes strong in bonding with the silica of the matrix component comprising the silica. Therefore, the amount of fixation to the substrate increases, and it is possible to achieve superior water repellency and waterdrop slippage capability.

As the solvent used in the first or second process, it is preferable to use lower alcohols such as ethyl alcohol and isopropyl alcohol, ketones such as methyl ethyl ketone, methyl isobutyl ketone, esters such as ethyl acetate and butyl acetate, aromatic hydrocarbons such as toluene, benzene and xylene, ethers such as diethyl ether and diisopropyl ether, chlorine-based solvents such as chloroform and carbon tetrachloride, and mixtures thereof.

In the first or second process, the obtained coating solution is applied to the substrate surface. As the application method, it is possible to suitably use various film forming methods such as hand brushing, nozzle flow coating, dip coating, spraying, reverse coating, flexography, printing, flow coating, spin coating, and a combination of these. It can be used as an easy-type, spray-type, water repellent treatment agent.

Then, a heat treatment is conducted, thereby allowing a polycondensation of the silica sol and the alkoxy-group-terminated dimethyl silicone and the fluoroalkylsilane to proceed and thereby bonding the silylated-terminal dimethyl silicone and the fluoroalkylsilane and the silica matrix together and at the same time fixedly bonding the functional film to the substrate surface. As the heat treatment temperature, 80° C. to 600° C. is preferable. If the heat treatment temperature is less than 80° C., not only the above polycondensation becomes insufficient, but also the functional film is not sufficiently bonded to the substrate. As a result, durability lowers, and it is not preferable. On the other hand, if it exceeds 600° C., the dimethyl silicone and the fluoroalkyl silane are pyrolyzed, thereby significantly lowering waterdrop slippage capability. Therefore, it is not preferable.

The substrate is not particularly limited to glass, plastic and the like. For example, in the case of glass substrate, an inorganic, transparent plate glass is preferable such as float glass, commonly used for architectural window glass and automotive window glass, or soda-lime silicate glass produced by rollout method. There are no particular limitations with respect to colorlessness or coloredness, its type or color tone, a combination with other functional films, and glass shape. In addition to as flat plate glass and curved plate glass, it is possible to use various tempered glasses such as air-quench tempered glass and chemically strengthened glass and various glasses such as wired glass, borosilicate glass, low-expansion glass, zero expansion glass, TFT glass, PDP glass, and substrate glass for optical filter.

The glass can be used in a single plate and as a multiple-layered glass or laminated glass. Furthermore, the film may be formed on one surface or both surfaces of the substrate and may be formed on the entirety or a part of the substrate surface.

In the following, the present invention is explained in detail by examples, but the present invention is not limited to these examples.

As shown in the following Examples 1-1 to 1-13 and 3-1 and 3-5, the functional film of the present invention is provided with high waterdrop slippage capability and durability, particularly mud water abrasion resistance and wear resistance by wipers and the like. Therefore, in case that it is used for vehicular window glass and the like, forward, sideward and rearward visions are easily secured, thereby improving driving safety. Furthermore, significant advantageous effects are achieved such as this effect being maintained for a long time. Furthermore, as shown in the following Examples 2-1 to 2-13, a functional film of the present invention is superior in high water repellency, water-drop slippage capability, and wear resistance by wipers and the like. In addition, it prevents the occurrence of judder upon the wiper sliding movement. Therefore, in case that it is used for a vehicular windshield glass, it becomes easy to obtain a forward visibility under a rainy weather, and the driving safety is improved without worry about wiper judder. Furthermore, it is possible to achieve remarkable advantageous effects such as that this effect can be maintained for a long time.

The following Examples 1-1 to 1-13 and Examples 2-1 to 2-13 correspond to the first process. In contrast, the following Examples 3-1 to 3-5 correspond to the second process.

together, followed by stirring for about 15 hr at room temperature, thereby obtaining silica sol X.

(2) Coating Solution Preparation

A coating solution was obtained by adding the above silica sol X to a mixture obtained by mixing together an alkoxy-group-terminated dimethyl silicone and a fluoroalkylsilane, followed by mixing. The preparation conditions of the sample are shown in Table 1.

TABLE 1

| | Alkoxy-terminated dimethyl silicone | | | | | | Heat |
|---|---|---|---|---|---|---|---|
| | Average degree of polymerization | No. of alkoxy groups | Fluoroalkylsilane | Silica Conc. (wt %) | Silicone Conc. (wt %) | Fluoroalkylsilane Conc. (wt %) | Treatment Temp. (° C.) |
| Ex. 1-1 | 200 | 6 | C8 fluoroalkylsilane | 0.1 | 1.0 | 10 | 280 |
| Ex. 1-2 | 300 | 6 | C8 fluoroalkylsilane | 0.1 | 1.0 | 10 | 280 |
| Ex. 1-3 | 500 | 6 | C8 fluoroalkylsilane | 0.1 | 1.0 | 10 | 280 |
| Ex. 1-4 | 50 | 6 | C8 fluoroalkylsilane | 0.1 | 1.0 | 10 | 280 |
| Ex. 1-5 | 150 | 6 | C8 fluoroalkylsilane | 0.1 | 1.0 | 10 | 280 |
| Ex. 1-6 | 200 | 6 | C8 fluoroalkylsilane | 0.1 | 0.5 | 10 | 280 |
| Ex. 1-7 | 200 | 6 | C8 fluoroalkylsilane | 0.1 | 1.0 | 11 | 280 |
| Ex. 1-8 | 250 | 6 | C8 fluoroalkylsilane | 0.1 | 1.0 | 9 | 280 |
| Ex. 1-9 | 300 | 6 | C8 fluoroalkylsilane | 0.1 | 1.5 | 10 | 280 |
| Ex. 1-10 | 300 | 6 | C8 fluoroalkylsilane | 0.1 | 1.5 | 11 | 280 |
| Ex. 1-11 | 300 | 6 | C10 fluoroalkylsilane | 0.1 | 1.5 | 9 | 280 |
| Ex. 1-12 | 300 | 6 | C10 fluoroalkylsilane | 0.1 | 1.5 | 10 | 280 |
| Ex. 1-13 | 200 | 6 | C8 fluoroalkylsilane | 0.1 | 1.0 | 10 | 150 |
| Com. Ex. 1-1 | 200 | 6 | None | 0.1 | 1.0 | 0 | 280 |
| Com. Ex. 1-2 | 150 | 6 | C8 fluoroalkylsilane | 0 | — | — | 100 |
| Com. Ex. 1-3 | 200 | 6 | C8 fluoroalkylsilane | 0.1 | 50.0 | 3 | 280 |
| Com. Ex. 1-4 | 2500 | 4 | C8 fluoroalkylsilane | 0.1 | 1.0 | 10 | 280 |
| Com. Ex. 1-5 | 200 | 6 | C8 fluoroalkylsilane | 0.1 | 20.0 | 10 | 280 |
| Com. Ex. 1-6 | 200 | 6 | C8 fluoroalkylsilane | 0.1 | 1.0 | 30 | 280 |
| Com. Ex. 1-7 | 200 | 6 | C8 fluoroalkylsilane | 1.0 | 1.0 | 10 | 280 |
| Com. Ex. 1-8 | 200 | 6 | C8 fluoroalkylsilane | 0.1 | 1.0 | 10 | No |

EXAMPLE 1-1

(1) Silica Sol Preparation

A silica sol was prepared by conducting hydrolysis and polycondensation of tetraethoxysilane [$Si(OC_2H_5)_4$: TEOS].

At first, 312.5 g of TEOS and 450.0 g of EKINEN F1 (a lower alcohol mixture of 90 wt % ethanol and 10 wt % isopropyl alcohol) were mixed together, followed by stirring for about 30 min, thereby obtaining solution A. Furthermore, 7.5 g of 60 wt % nitric acid aqueous solution, 210.0 g of $H_2O$, and 20.0 g of EKINEN F1 were mixed together, followed by stirring for about 30 min, thereby obtaining solution B. Then, solution A and solution B were mixed At first, there were mixed together 0.72 g of a heptadecafluorodecyltrimethoxysilane [$CF_3(CF_2)_7CH_2CH_2Si(OCH_3)_3$, hereinafter abbreviated to "C8 fluoroalkylsilane"] diluted to 1 wt % with ethyl acetate, 0.70 g of an alkoxy-group-terminated dimethyl silicone solution [$(CH_3O)_3SiCH_2CH_2[Si(CH_3)_2O]_{200}Si(CH_3)_2CH_2CH_2Si(OCH_3)_3$] that has been diluted to 0.1 wt % with ethyl acetate and that has an average degree of polymerization n of 200, 7.00 g of methyl ethyl ketone, and 7.00 g of isopropyl alcohol, followed by stirring for about 5 min. Then, 0.78 g of the above silica sol X were added, followed by stirring for about 15 hr at room temperature. Then, 26.8 g of methyl ethyl ketone and 26.8 g of isopropyl alcohol were added, followed by stirring for 30 min. By the above process, there was obtained a coating solution in which the silica concentration was 0.1 wt %, in which the weight ratio of the alkoxy-group-terminated dimethyl silicone relative to the silica-converted amount of the silica sol (hereinafter written as "silicone concentration") was 1 wt %, and the weight ratio of the fluoroalkylsilane relative to the silica-converted amount of the silica sol (hereinafter written as "fluoroalkylsilane concentration") was 10 wt %.

(3) Glass Substrate Washing

A surface of a float glass of a size of 1200 mm×800 mm×2 mm thickness was abraded with an abrasive liquid and then washed and dried with a glass washer. As the abrasive liquid, a suspension in which a glass abrasive agent, MIREK A(T) (made by Mitsui Mining and Smelting Co., Ltd.), was dispersed in tap water was used.

(4) Functional Film Formation

The coating solution prepared by the above (2) was applied by a spin coating onto the glass substrate prepared by the above (3). Firstly, the above glass substrate was placed on a spin coating machine. While it was rotated at a rotation speed of 80 rpm, the coating solution of about 200 ml was dropped. The rotation speed was maintained for 30 seconds to dry the coated film, thereby obtaining a transparent gel film of a good quality. Then, a heating treatment was conducted at 280° C. for 10 min, followed by cooling down to room temperature, thereby obtaining a glass sample (a highly water drop slippage capable article) with a functional film having a film thickness of 20 nm.

Water slippage capability in the present invention is evaluated by methods described in the evaluation methods of Examples. It is evaluated by dropping a pure water of 50 $\mu$l onto the sample surface and then by measuring the inclination angle when the water drop starts to move while the sample is gradually inclined. The above inclination angle refers to sliding angle (°), and the sliding angle was measured in the atmosphere (about 25° C.) using CA-A type made by Kyowa Interface Science Co., Ltd.

The obtained functional film was evaluated by the following evaluation methods. The results are shown in Table 2.

[Functional Film Evaluation Methods]

(1) Contact Angle

When about 2 $\mu$l of pure water were placed on the sample surface having the functional film, the angle between the water drop and the sample surface was measured with a contact angle meter. CA-X type made by Kyowa Interface Science Co., Ltd. was used as the contact angle meter, and the measurement was conducted in the atmosphere (about 25° C.).

(2) Sliding Angle

In a condition in which the sample was maintained horizontally, pure water of 50 $\mu$l was dropped onto the sample surface. Then, the sample was inclined gradually, and the inclination angle at the time when the water drop starts to move was defined as sliding angle (°). The sliding angle was measured in the atmosphere (about 25° C.) using CA-A type made by Kyowa Interface Science Co., Ltd.

(3) Ceria Abrasion Test

A cotton cloth moistened with a suspension (10 wt %), in which a glass abrasive agent, MIREK A(T) (made by Mitsui Kinzoku Kogyo), was dispersed in tap water, was rubbed against the sample surface with a strength of about 1.5 kg/cm$^2$. The number of rubbings (reciprocations) to make 70% of the abraded area hydrophilic was evaluated.

(4) Film Thickness

The film thickness of the functional film was measured with a SURF CORDER (made by Kosaka Laboratory Ltd., ET4000A).

(5) Wiper Abrasive Test

While the substrate formed with the functional film was sprinkled with water under a repeating condition of a sprinkling of tap water for 45 seconds with a sprinkling amount of 750 ml/min and a cessation for 15 seconds, a natural rubber based, water repellent rubber in contact with a pressing pressure of 16 g/cm was operated using a wiper driving system of an actual car. Herein, when the wiper rubber was reciprocated one time, it was counted as one time of wiping number. The wiper rubber was operated with a wiping speed of 48 times per minute. Viewed from the film side, the left side wiper rubber is referred to as a driver's seat side wiper, and the right side wiper rubber is referred to as a front passenger's seat side wiper.

TABLE 2

| | Film External Appearance | Initial Capability | | Film Thickness (nm) | Ceria Abrasion Test (reciprocations) |
|---|---|---|---|---|---|
| | | Contact Angle (°) | Sliding Angle (°) | | |
| Ex. 1-1 | Uniform & transparent | 114 | 10 | 20 | 140 |
| Ex. 1-2 | Uniform & transparent | 112 | 12 | 20 | 180 |
| Ex. 1-3 | Uniform & transparent | 113 | 12 | 20 | 200 |
| Ex. 1-4 | Uniform & transparent | 113 | 11 | 20 | 140 |
| Ex. 1-5 | Uniform & transparent | 114 | 10 | 20 | 160 |
| Ex. 1-6 | Uniform & transparent | 113 | 12 | 20 | 150 |
| Ex. 1-7 | Uniform & transparent | 113 | 12 | 30 | 170 |
| Ex. 1-8 | Uniform & transparent | 113 | 8 | 30 | 120 |
| Ex. 1-9 | Uniform & transparent | 113 | 10 | 30 | 120 |
| Ex. 1-10 | Uniform & transparent | 113 | 12 | 30 | 150 |
| Ex. 1-11 | Uniform & transparent | 111 | 12 | 30 | 130 |
| Ex. 1-12 | Uniform & transparent | 111 | 12 | 30 | 150 |
| Ex. 1-13 | Uniform & transparent | 112 | 10 | 20 | 50 |
| Com. Ex. 1-1 | Uniform & transparent | 105 | 7 | 20 | 10 |

TABLE 2-continued

|  | Film External Appearance | Initial Capability | | Film Thickness (nm) | Ceria Abrasion Test (reciprocations) |
|---|---|---|---|---|---|
|  |  | Contact Angle (°) | Sliding Angle (°) |  |  |
| Com. Ex. 1-2 | Uniform & transparent | 113 | 19 | <10 | <5 |
| Com. Ex. 1-3 | Uniform & transparent | 106 | 10 | 30 | 35 |
| Com. Ex. 1-4 | White haze | No evaluation | | 20 | No evaluation |
| Com. Ex. 1-5 | White haze | No evaluation | | 30 | No evaluation |
| Com. Ex. 1-6 | White haze | No evaluation | | 30 | No evaluation |
| Com. Ex. 1-7 | White haze | No evaluation | | 130 | No evaluation |
| Com. Ex. 1-8 | Uniform & transparent | 112 | 11 | 30 | 10 |

EXAMPLE 1-2

Example 1-1 was repeated except in that an alkoxy-group-terminated dimethyl silicone [$(C_2H_5O)_3SiCH_2CH_2[Si(CH_3)_2O]_{300}Si(CH_3)_2CH_2CH_2Si(OC_2H_5)_3$] of an average degree of polymerization n of 300 was used.

EXAMPLE 1-3

Example 1-1 was repeated except in that an alkoxy-group-terminated dimethyl silicone [$(CH_3O)_3SiCH_2CH_2[Si(CH_3)_2O]_{500}Si(CH_3)_2CH_2CH_2Si(OCH_3)_3$] of an average degree of polymerization n of 500 was used.

EXAMPLE 1-4

Example 1-1 was repeated except in that an alkoxy-group-terminated dimethyl silicone [$(CH_3O)_3SiCH_2CH_2[Si(CH_3)_2O]_{50}Si(CH_3)_2CH_2CH_2Si(OCH_3)_3$] of an average degree of polymerization n of 50 was used.

EXAMPLE 1-5

Example 1-1 was repeated except in that an alkoxy-group-terminated dimethyl silicone [$(CH_3O)_3SiO[Si(CH_3)_2O]_{150}Si(OCH_3)_3$] of an average degree of polymerization n of 150 was used.

EXAMPLE 1-6

Example 1-1 was repeated except in that the silicone concentration was 0.5 wt %.

EXAMPLE 1-7

Example 1-1 was repeated except in that the fluoroalkylsilane concentration was 11 wt %.

EXAMPLE 1-8

Example 1-1 was repeated except in that an alkoxy-group-terminated dimethyl silicone [$(CH_3O)_3SiO[Si(CH_3)_2O]_{250}Si(OCH_3)_3$] of an average degree of polymerization n of 250 was used and that the fluoroalkylsilane concentration was 9 wt %.

EXAMPLE 1-9

Example 1-2 was repeated except in that the silicone concentration was 1.5 wt %.

EXAMPLE 1-10

Example 1-2 was repeated except in that the silicone concentration was 1.5 wt % and that the fluoroalkylsilane concentration was 11 wt %.

EXAMPLE 1-11

Example 1-2 was repeated except in that henicosafluorododecyltrimethoxysilane [$CF_3(CF_2)_9CH_2CH_2Si(OCH_3)_3$, hereinafter abbreviated to "C10 fluoroalkylsilane"] was used as the fluoroalkylsilane, that the silicone concentration was 1.5 wt %, and that the fluoroalkylsilane concentration was 9 wt %.

EXAMPLE 1-12

Example 1-11 was repeated except in that the fluoroalkylsilane concentration was 10 wt %. The wiper abrasive test results are shown in FIGURE and Table 3. The contact angle of a region (duplication portion), which was wiped with both wipers on the driver's seat side and the front passenger's seat side, was 92° even after the 330 thousand wipings, showing maintenance of high contact angle. Furthermore, deterioration of an upper reciprocal portion of the front passenger's side wiper was also small, showing a good durability.

TABLE 3

| Number of Rubbings | Appearance of Upper Reciprocal Portion of Front Passenger's Side Wiper | |
|---|---|---|
|  | Example 1-12 | Com. Ex. 1-3 |
| 0 times | No change | No change |
| 50 thousand times | No change | It was made hydrophilic in the form of streaks |
| 70 thousand times | No change | — |
| 140 thousand times | No change | It was made hydrophilic in the form of streaks |
| 280 thousand times | No change | — |
| 330 thousand times | A part was made hydrophilic in the form of streaks. | It was made hydrophilic in the form of bands (3 cm width). |

EXAMPLE 1-13

Example 1-1 was repeated except in that the heat treatment was conducted at 150° C. for 10 min.

COMPARATIVE EXAMPLE 1-1

Example 1-1 was repeated except in that the fluoroalkylsilane concentration was 0 wt %. That is, a film containing no fluoroalkylsilane was produced in the present comparative example.

COMPARATIVE EXAMPLE 1-2

4.0 ml of a solution obtained by mixing and stirring of 0.72 g of a C8 fluoroalkylsilane solution diluted to 1 wt % with ethyl acetate and 0.70 g of an alkoxy-group-terminated dimethyl silicone $[(CH_3O)_3SiO[Si(CH_3)_2O]_{150}Si(OCH_3)_3]$ solution of an average degree of polymerization n of 150 diluted to 0.1 wt % with ethyl acetate were dropped onto a glass substrate, followed by a sufficient extension over the entire glass surface with a cotton cloth (trade name: BEMCOT) and then air-drying for about 5 min. Then, a heat treatment was conducted in a muffle furnace at 100° C. for 10 min. A white-haze remainder of the water slippage capable agent was wiped with isopropyl alcohol, thereby obtaining a transparent sample. That is, a film containing no silica matrix was produced in the present comparative example.

COMPARATIVE EXAMPLE 1-3

Example 1-1 was repeated except in that the silicone concentration was 50.0 wt % and that the fluoroalkylsilane concentration was 3 wt %. The wiper abrasive test results are shown in FIGURE and Table 3. The contact angle of a region (duplication portion), which was wiped with both wipers on the driver's seat side and the front passenger's seat side, was as low as 60° after the 330 thousand wipings. Furthermore, an upper reciprocal portion of the front passenger's side wiper also deteriorated in a wide region, showing an inferior durability.

COMPARATIVE EXAMPLE 1-4

Example 1-1 was repeated except in that an alkoxy-group-terminated dimethyl silicone $[(CH_3O)_2(CH_3)SiCH_2CH_2[Si(CH_3)_2O]_{2500}Si(CH_3)_2CH_2CH_2Si(CH_3)(OCH_3)_2]$ of an average degree of polymerization n of 2,500 was used.

COMPARATIVE EXAMPLE 1-5

Example 1-1 was repeated except in that the silicone concentration was 20 wt %.

COMPARATIVE EXAMPLE 1-6

Example 1-1 was repeated except in that the fluoroalkylsilane concentration was 30 wt %.

COMPARATIVE EXAMPLE 1-7

Example 1-1 was repeated except in that the silica concentration of the coating solution was 1.0 wt %.

COMPARATIVE EXAMPLE 1-8

Example 1-1 was repeated except in that the heat treatment of the obtained film was omitted.

EXAMPLE 2-1

(1) Silica Sol Preparation

A silica sol was obtained by the same process as that of Example 1-1.

(2) Coating Solution Preparation

A coating solution was obtained by adding the above silica sol to a mixture obtained by mixing together an alkoxy-group-terminated dimethyl silicone and a fluoroalkylsilane, followed by mixing. The preparation conditions of the sample are shown in Table 4.

TABLE 4

| | Average degree of polymerization | Fluoroalkylsilane | Silica Conc. (wt %) | Silicone Conc. (wt %) | FAS Molar Ratio |
|---|---|---|---|---|---|
| Ex. 2-1 | 250 | C8FAS | 0.1 | 2.5 | 81 |
| Ex. 2-2 | 250 | C8FAS | 0.1 | 2.0 | 111 |
| Ex. 2-3 | 250 | C8FAS | 0.1 | 1.7 | 136 |
| Ex. 2-4 | 250 | C8FAS | 0.1 | 1.4 | 173 |
| Ex. 2-5 | 250 | C8FAS | 0.1 | 3.5 | 81 |
| Ex. 2-6 | 250 | C8FAS | 0.1 | 2.5 | 97 |
| Ex. 2-7 | 250 | C8FAS | 0.1 | 3.0 | 81 |
| Ex. 2-8 | 250 | C8FAS | 0.1 | 4.0 | 60 |
| Ex. 2-9 | 250 | C8FAS | 0.1 | 5.0 | 48 |
| Ex. 2-10 | 250 | C8FAS | 0.1 | 6.0 | 40 |
| Ex. 2-11 | 150 | C8FAS | 0.1 | 2.5 | 49 |
| Ex. 2-12 | 200 | C8FAS | 0.1 | 2.5 | 65 |
| Ex. 2-13 | 300 | C8FAS | 0.1 | 2.5 | 97 |
| Com. Ex. 2-1 | 250 | C8FAS | 0.1 | 50 | 2.6 |
| Com. Ex. 2-2 | 200 | C8FAS | 0.1 | 0.5 | 550 |
| Com. Ex. 2-3 | — | C8FAS | 0.1 | 0 | — |
| Com. Ex. 2-4 | 250 | C8FAS | 0 | — | 81 |

At first, there were mixed together 0.43 g of a heptadecafluorodecyltrimethoxysilane $[CF_3(CF_2)_7CH_2CH_2Si(OCH_3)_3$, hereinafter abbreviated to "C8FAS"] diluted to 1 wt % with ethyl acetate, 0.88 g of an alkoxy-group-terminated dimethyl silicone $[(CH_3O)_3SiCH_2CH_2\{Si(CH_3)_2O\}_{250}Si(CH_3)_2CH_2CH_2Si(OCH_3)_3]$ solution that has been diluted to 0.2 wt % with ethyl acetate and that has an average degree of polymerization n of 250, 7.00 g of methyl ethyl ketone, and 7.00 g of isopropyl alcohol, followed by stirring for about 5 min. Then, 0.78 g of the above silica sol were added, followed by stirring for about 15 hr at room temperature. Then, 27.06 g of methyl ethyl ketone and 27.06 g of isopropyl alcohol were added, followed by stirring for 30 min. By the above process, there was obtained a coating solution in which the silica concentration was 0.1 wt %, in which the weight ratio of the alkoxy-group-terminated dimethyl silicone relative to the silica-converted amount of the silica sol (hereinafter written as "silicone concentration" was 2.5 wt %, and the molar ratio of FAS to the alkoxy-group-terminated dimethyl silicone ((the number of moles of fluoroalkylsilane)/(the number of moles of the alkoxy-group-terminated dimethyl silicone), hereinafter written as "FAS molar ratio") was 81.

(3) Glass Substrate Washing

A float glass surface of an actual automotive windshield size (about 1500 mm×1000 mm) was abraded with an abrasive liquid and then washed with water and dried. The same abrasive liquid as that of Example 1-1 was used.

(4) Highly Durable Functional Film Formation

The coating solution prepared by the above (2) was applied by a spin coating onto the glass substrate prepared by the above (3). Firstly, the above glass substrate was placed on a spin coating machine. While it was rotated at a rotation speed of 80 rpm, the coating solution of about 300 ml was dropped. The rotation speed was maintained for 30 seconds to dry the coated film, thereby obtaining a transparent gel film of a good quality. Then, a heating treatment was conducted at 370° C. for 7 min, followed by cooling down to room temperature, thereby obtaining a colorless, transparent, highly durable, glass sample with a water drop slippage capable film.

The obtained functional film was evaluated by the following evaluation methods. The results are shown in Tables 5 and 6.

(1) Contact Angle

The contact angle was measured by the same method as that of Example 1-1.

(2) Sliding Angle

The sliding angle was measured by the same method as that of Example 1-1.

(3) Wiper Sliding Movement Test

While the film surface of the substrate formed with the, functional film was sprinkled with water under a repeating condition of a sprinkling of tap water for 45 seconds with a sprinkling amount of 700 ml/min and a cessation for 15 seconds, a wiper blade, to which a natural rubber based, water repellent rubber in contact with a pressing pressure of 16 g/cm had been attached, was operated using a wiper driving system of an actual car. Upon this, the inclination angle of the above substrate was about 30°. As the wiper rubber, a water repellent wiper rubber (type: 1UT7-67-33H) made by Mazda Motor Corporation was used. Upon this, when the wiper blade was reciprocated one time, it was counted as one time of wiping number. The wiper blade was operated with a wiping speed of 48 times per minute.

As to the driver's seat side film, the contact angle and judder evaluations before the sliding movement and after 270 thousand times sliding movement of the wiper were conducted. In the judder evaluation, the condition of the occurrence of vibration (chatter) of the lower end portion of the wiper blade and of the blade entirety was observed with naked eyes. A level of no driving obstruction due to no chattering was judged as "good", and a level of driving obstruction due to a loud chattering was judged as "not good".

TABLE 5

|  | Film | Initial Capability | |
|---|---|---|---|
|  | External Appearance | Contact Angle (°) | Sliding Angle (°) |
| Ex. 2-1 | Colorless & Transparent | 108 | 8 |
| Ex. 2-2 | Colorless & Transparent | 110 | 9 |
| Ex. 2-3 | Colorless & Transparent | 111 | 8 |
| Ex. 2-4 | Colorless & Transparent | 110 | 8 |
| Ex. 2-5 | Colorless & Transparent | 109 | 14 |
| Ex. 2-6 | Colorless & Transparent | 108 | 12 |
| Ex. 2-7 | Colorless & Transparent | 108 | 13 |
| Ex. 2-8 | Colorless & Transparent | 108 | 14 |
| Ex. 2-9 | Colorless & Transparent | 109 | 12 |
| Ex. 2-10 | Colorless & Transparent | 109 | 13 |
| Ex. 2-11 | Colorless & Transparent | 108 | 10 |
| Ex. 2-12 | Colorless & Transparent | 109 | 10 |
| Ex. 2-13 | Colorless & Transparent | 108 | 11 |
| Com. Ex. 2-1 | Colorless & Transparent | 105 | 8 |
| Com Ex. 2-2 | Colorless & Transparent | 111 | 20 |
| Com. Ex. 2-3 | Spot-like | 113 | 27 |
| Com. Ex. 2-4 | Colorless & Transparent | 78 | 20 |

TABLE 6

|  | Initial | | After 270 Thousand Sliding Movement | |
|---|---|---|---|---|
|  | Judder Evaluation | Contact Angle | Judder Evaluation | Contact Angle |
| Ex. 2-1 | Good | 108 | Good | 81 |
| Ex. 2-2 | Good | 110 | Good | 81 |
| Ex. 2-3 | Good | 111 | Good | 81 |
| Ex. 2-4 | Good | 110 | Good | 90 |
| Ex. 2-5 | Good | 109 | Good | 87 |
| Ex. 2-6 | Good | 108 | Good | 90 |
| Ex. 2-7 | Good | 108 | Good | 85 |
| Ex. 2-8 | Good | 108 | Good | 87 |
| Ex. 2-9 | Good | 109 | Good | 88 |
| Ex. 2-10 | Good | 109 | Good | 92 |
| Ex. 2-11 | Good | 108 | Good | 87 |
| Ex. 2-12 | Good | 109 | Good | 86 |
| Ex. 2-13 | Good | 108 | Good | 88 |
| Com. Ex. 2-1 | Good | 105 | Good | 55 |
| Com. Ex. 2-2 | Not Good | 111 | Not Good | 87 |
| Com. Ex. 2-3 | Not Good | 113 | Not Good | 100 |
| Com. Ex. 2-4 | No Evaluation | | | |

EXAMPLE 2-2

Example 2-1 was repeated except in that 0.47 g of the C8FAS solution and 0.70 g of the alkoxy-group-terminated dimethyl silicone solution were used.

EXAMPLE 2-3

Example 2-1 was repeated except in that 0.49 g of the C8FAS solution and 0.60 g of the alkoxy-group-terminated dimethyl silicone solution were used.

EXAMPLE 2-4

Example 2-1 was repeated except in that 0.51 g of the C8FAS solution and 0.49 g of the alkoxy-group-terminated dimethyl silicone solution were used.

EXAMPLE 2-5

Example 2-1 was repeated except in that 0.60 g of the C8FAS solution and 1.22 g of the alkoxy-group-terminated dimethyl silicone solution were used.

EXAMPLE 2-6

Example 2-1 was repeated except in that 0.51 g of the C8FAS solution were used.

EXAMPLE 2-7

Example 2-6 was repeated except in that 1.05 g of the alkoxy-group-terminated dimethyl silicone solution were used.

EXAMPLE 2-8

Example 2-6 was repeated except in that 1.41 g of the alkoxy-group-terminated dimethyl silicone solution were used.

EXAMPLE 2-9

Example 2-6 was repeated except in that 1.76 g of the alkoxy-group-terminated dimethyl silicone solution were used.

EXAMPLE 2-10

Example 2-6 was repeated except in that 2.10 g of the alkoxy-group-terminated dimethyl silicone solution were used.

EXAMPLE 2-11

Example 2-1 was repeated except in that the average degree of polymerization of an alkoxy-group-terminated dimethyl silicone $[(CH_3O)_3SiCH_2CH_2\{Si(CH_3)_2O\}_{150}Si(CH_3)_2CH_2CH_2Si(OCH_3)_3]$ was 150.

EXAMPLE 2-12

Example 2-1 was repeated except in that the average degree of polymerization of an alkoxy-group-terminated dimethyl silicone $[(CH_3O)_3SiCH_2CH_2\{Si(CH_3)_2O\}_{200}Si(CH_3)_2CH_2CH_2Si(OCH_3)_3]$ was 200.

EXAMPLE 2-13

Example 2-1 was repeated except in that the average degree of polymerization of an alkoxy-group-terminated dimethyl silicone $[(CH_3O)_3SiCH_2CH_2\{Si(CH_3)_2O\}_{300}Si(CH_3)_2CH_2CH_2Si(OCH_3)_3]$ was 300.

COMPARATIVE EXAMPLE 2-1

Example 2-1 was repeated except in that 0.27 g of the C8FAS solution and 0.88 g of the alkoxy-group-terminated dimethyl silicone (average degree of polymerization: 250) solution diluted to 4 wt % were added.

COMPARATIVE EXAMPLE 2-2

Example 2-1 was repeated except in that the average degree of polymerization of the alkoxy-group-terminated dimethyl silicone was 200, and 0.18 g of the solution were added.

COMPARATIVE EXAMPLE 2-3

Example 2-1 was repeated except in that the silicone concentration was 0 wt %. That is, there was prepared a film containing only the fluoroalkylsilane in the matrix formed of silica, with no alkoxy-group-terminated dimethyl silicone.

As a result, spot-like marks were generated over the entire surface of the film.

COMPARATIVE EXAMPLE 2-4

Example 2-1 was repeated except in that the silica concentration was 0 wt %. That is, a film containing no silica as the matrix component was prepared.

EXAMPLE 3-1

(1) Silica Sol Preparation

A silica sol was obtained by the same process as that of Example 1-1.

(2) Coating Solution Preparation

A coating solution was obtained by mixing together a solution previously obtained by hydrolysis and polycondensation of an alkoxy-group-terminated dimethyl silicone and a fluoroalkylsilane, with the above silica sol.

At first, there were mixed together 3.60 g of a heptadecafluorodecyltrimethoxysilane $[CF_3(CF_2)_7CH_2CH_2Si(OCH_3)_3$, hereinafter abbreviated to "C8FASM"] solution diluted to 1 wt % with ethyl acetate, 3.50 g of an alkoxy-group-terminated dimethyl silicone $[(CH_3O)_3SiCH_2CH_2[Si(CH_3)_2O]_{200} Si(CH_3)_2CH_2CH_2Si(OCH_3)_3]$ solution that has been diluted to 0.1 wt % with ethyl acetate and that has an average degree of polymerization of 200, 0.03 g of 0.1 mol/l nitric acid aqueous solution, 17.50 g of methyl ethyl ketone, and 17.50 g of isopropyl alcohol, followed by stirring for about 4 hr. Then, 6.00 g of a dehydrating agent (molecular sieve: 4A) were added, followed by standing still for about 14 hr at room temperature, thereby obtaining solution Y. Then, 33.73 g of solution Y, 3.12 g of the above silica sol, 14.00 g of methyl ethyl ketone, and 14.00 g of isopropyl alcohol were added, followed by stirring for about 10 hr at room temperature. Then, 107.20 g of methyl ethyl ketone and 107.20 g of isopropyl alcohol were added, followed by stirring for 30 min. By the above process, there was obtained a coating solution in which the silica concentration was 0.1 wt %, in which the alkoxy-group-terminated dimethyl silicone concentration (hereinafter abbreviated to "silicone concentration") relative to the silica was 1 wt %, and in which the fluoroalkylsilane concentration (hereinafter abbreviated to "FAS concentration") relative to the silica was 10 wt %.

TABLE 7

|  | Degree of Polymerization of Silicone | Fluoroalkylsilane | Silica Conc. (wt %) | Silicone Conc. (wt %) | FAS Con. (wt %) | Heat Treatment Temp. (° C.) |
| --- | --- | --- | --- | --- | --- | --- |
| Ex. 3-1 | 200 | C8FASM | 0.1 | 1 | 10 | 280 |
| Ex. 3-2 | 200 | C8FASC | 0.1 | 1 | 10 | 280 |
| Ex. 3-3 | 300 | C10FASM | 0.1 | 1.5 | 10 | 280 |
| Ex. 3-4 | 300 | C10FASC | 0.1 | 1.5 | 10 | 280 |
| Ex. 3-5 | 200 | C8FASM | 0.1 | 1 | 10 | 150 |
| Com. Ex. 3-1 | 50 | C8FASM | 0.1 | 1 | 10 | 280 |
| Com. Ex. 3-2 | 200 | C8FASM | 0.5 | 1 | 10 | 280 |
| Com. Ex. 3-3 | 200 | C8FASM | 0.1 | 1 | 10 | No Heat Treatment |
| Com. Ex. 3-4 | — | C8FASM | 0.1 | 0 | 10 | 280 |
| Com. Ex. 3-5 | 200 | C8FASM | 0 | — | 10 | 280 |

(3) Glass Substrate Washing

A float glass surface of a size of 300 mm×300 mm×2 mmt was abraded with an abrasive liquid, followed by washing with water and drying with a glass washer. The same abrasive liquid as that of Example 1-1 was used.

(4) Functional Film Formation

The coating solution prepared by the above (2) was applied by a spin coating onto the glass substrate prepared by the above (3). Firstly, the above glass substrate was placed on a spin coating machine. While it was rotated at a rotation speed of 80 rpm, the coating solution of about 300 ml was dropped. The rotation speed was maintained for 30 seconds to dry the coated film, thereby obtaining a transparent gel film of a good quality. Then, a heating treatment was conducted at 280° C. for 10 min, followed by cooling down to room temperature, thereby obtaining a glass with a 20 nm film thickness, colorless, transparent, highly durable, functional film.

The obtained film was evaluated by the following evaluation methods. The results are shown in Table 8.

(1) Contact Angle

The contact angle was measured by the same method as that of Example 1-1.

(2) Sliding Angle

The sliding angle was measured by the same method as that of Example 1-1.

(3) Film Thickness

The film thickness of the functional film was measured with an ellipsometer (made by Mizojiri Optical Co., Ltd., DVA-FL3G). As to the films that are not optically transparent and that do not allow the measurement with an ellipsometer, the measurement was conducted with a surface roughness meter (made by Solan tech., DEKTAK2A).

(4) Ceria Abrasion Test

A cotton cloth was bonded to a metal piece that had a width of 20 mm (length: 20 mm) and a curved surface of R45 in a longitudinal direction. This was moistened with a ceria suspension (10 wt %), in which a glass abrasive agent MIREK A(T) (made by Mitsui Kinzoku Kogyo) was dispersed in tap water, thereby preparing an abrasive member. Upon this, the load onto the abrasive member was set to 3 kg. A region of 100 mm×20 mm was abraded with this abrasive member with a sliding movement speed of 60 times per minute, and there was measured the number of the sliding movements (reciprocations) until making a region of a central portion 70 mm×15 mm of the abrasion part have hydrophilicity.

TABLE 8

|  | Film External Appearance | Film Thickness (nm) | Initial Capability | | Ceria Abrasion Test (times) |
|---|---|---|---|---|---|
|  |  |  | Contact Angle (°) | Sliding Angle (°) |  |
| Ex. 3-1 | Colorless & Transparent | 20 | 110 | 12 | 140 |
| Ex. 3-2 | Colorless & Transparent | 20 | 109 | 13 | 200 |
| Ex. 3-3 | Colorless & Transparent | 20 | 112 | 13 | 170 |
| Ex. 3-4 | Colorless & Transparent | 20 | 112 | 13 | 140 |
| Ex. 3-5 | Colorless & Transparent | 20 | 112 | 10 | 90 |
| Com. Ex. 3-1 | Colorless & Transparent | 20 | 110 | 14 | 40 |
| Com. Ex. 3-2 | White Haze | 100 | 107 | 14 | 40 |
| Com. Ex. 3-3 | Colorless & Transparent | 20 | 108 | 11 | 10 |
| Com. Ex. 3-4 | Spots | 20 | 113 | 27 | 100 |
| Com. Ex. 3-5 | Colorless & Transparent | Less than 10 | 78 | 20 | 15 |

EXAMPLE 3-2

Example 3-1 was repeated except in that heptadecafluorodecyltrichlorosilane [$CF_3(CF_2)_7CH_2CH_2SiCl_3$, hereinafter abbreviated to "C8FASC"] was used as the fluoroalkylsilane.

EXAMPLE 3-3

[$(CH_3O)_3SiCH_2CH_2[Si(CH_3)_2O]_{300}Si(CH_3)_2CH_2CH_2Si(OCH_3)_3$] having an average degree of polymerization of 300 was used as the alkoxy-group-terminated dimethyl silicone, and henicosafluorododecyltrimethoxysilane [$CF_3(CF_2)_9CH_2CH_2Si(OCH_3)_3$, hereinafter abbreviated to "C10FASM"] was used as the fluoroalkylsilane. The FAS concentration was set to 10 wt %, and the silicone concentration was set to 1.5 wt %. The process for preparing the coating solution was the same as that of Example 3-1.

EXAMPLE 3-4

Example 3-3 was repeated except in that henicosafluorododecyltrichlorosilane [$CF_3(CF_2)_9CH_2CH_2SiCl_3$, hereinafter abbreviated to "C10FASC"] was used as the fluoroalkylsilane.

EXAMPLE 3-5

Example 3-1 was repeated except in that the heat treatment was conducted at 150° C. for 10 min.

COMPARATIVE EXAMPLE 3-1

Example 3-1 was repeated except in that a polydimethylsiloxane [$HO[Si(CH_3)_2O]_{50}Si(CH_3)_2OH$] that had one hydroxyl group at each terminal and an average degree of polymerization of 50 was used as the silicone component.

COMPARATIVE EXAMPLE 3-2

Example 3-1 was repeated except in that the silica concentration was 0.5 wt %.

COMPARATIVE EXAMPLE 3-3

Example 3-1 was repeated except in that the heat treatment of the obtained film was omitted.

COMPARATIVE EXAMPLE 3-4

Example 3-1 was repeated except in that the silicone concentration was 0 wt %. That is, there was produced in the present comparative example a film that contained only the fluoroalkylsilane in the matrix formed of the silica, with no alkoxy-group-terminated dimethyl silicone.

COMPARATIVE EXAMPLE 3-5

Example 3-1 was repeated except in that the silica concentration was 0 wt %. That is, there was produced in the present comparative example a film containing no silica component as the matrix.

What is claimed is:

1. An article superior in making a waterdrop slip down a surface of the article, the article comprising:

a substrate; and a functional film formed on a surface of the substrate, the functional film comprising:

(a) a silica forming a matrix of the functional film;

(b) a silylated-terminal dimethyl silicone represented by the general formula [A], the dimethyl silicone being in an amount of from 0.1 wt % to 10 wt %, based on a total weight of the silica; and (c) a fluoroalkylsilane represented by the general formula [B],

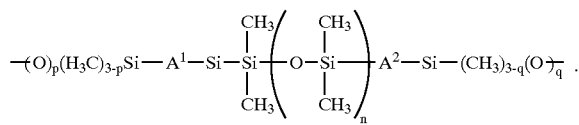

[A]

where each of $A^1$ and $A^2$ is independently a bivalent hydrocarbon group, —$(CH_2)_i$—NH—COO— group, where i is an integer of from 0 to 9, or oxygen; n is an interger of 2,000 or less and represents an average degree of polymerization; each of p and q is independently an integer of from 0 to 3; a total of p and q is 3 or greater; and each of terminal oxygens is independently bonded to a unit that is different from the dimethyl silicone or to another unit that is identical with the dimethyl silicone,

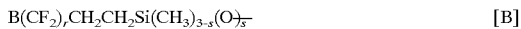

[B]

where B represents —$CF_3$ group or —$CH_2CH_2Si(CH_3)_{3-t}(O—)_t$ group, where t is an integer of from 1 to 3; r is an integer of from 0 to 12; s is an integer of from 1 to 3; and a terminal oxygen is bonded to a unit that is different from the fluoroalkylsilane or to another unit that is identical with the fluoroalkylsilane, wherein the fluoroalkylsilane is in an amount of from 3 wt % to 20 wt % based on the total weight of the silica.

2. An article according to claim 1, wherein n is an integer of from 5 to 1,000.

3. An article according to claim 1, wherein the fluoroalkylsilane is in an amount of from 20 moles to 200 moles, per mol of the dimethyl silicone.

4. A process for using an article according to claim 1, comprising the step of wiping the functional film of the article with a windshield wiper, when the article is used as a vehicular windshield.

5. A process for producing an article superior making a waterdrop slip down a surface of the article, the process comprising the steps of:
(a) mixing a silica precursor sol with (i) an alkoxy-group-terminated dimethyl silicone that is represented by the general formula [1] and that is in an amount of from 0.1 wt % to 10 wt %, based on a total weight of a silica that is to be produced from the silica precursor sol and (ii) a fluoroalkylsilane represented by the general formula [2], such that the alkoxy-group-terminated dimethyl silicone and the fluoroalkylsilane are subjected to hydrolysis and polycondensation to form a polycondensation product and such that a coating solution containing a mixture of the silica precursor sol and the polycondensation product is prepared; and
(b) applying the coating solution to a substrate,

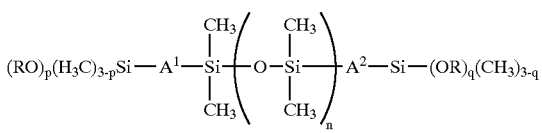

[1]

where each of $A^1$ and $A^2$ is independently a bivalent hydrocarbon group, —$(CH_2)_i$—NH—COO— group, where i is an integer of from 0 to 9, or oxygen R is a monovalent hydrocarbon group; a is an integer of 2,000 or less and represents an average degree of polymerization each of p and q is independently an integer of from 0 to 3; and a total of p and q is 3 or greater, $B(CF_2)_rCH_2CH_2Si(CH_3)_{3-s}X_s$ [2]

where B represents —$CF_s$ group or —$CH_2CH_2Si(CH_3)_{3-t}Y_t$ group, here Y represents a hydrolysable group and t is an integer of from 1 to 3; X presents a hydrolysable group; r is an integer of from 0 to 12; s is an integer of from 1 to 3.

6. A process according to claim 5, wherein a precursory film formed by the step (b) is heated at a temperature of from 80° C. to 600° C. into a functional film of the article.

7. A process according to claim 5, wherein n of the general formula [1] is from 5 to 1,000.

8. A process according to claim 5, wherein the fluoroalkylsilane of the step (a) is in an amount of from 3 wt % to 20 wt %, based on the to weight of the silica that is to be produced from the silica precursor sol.

9. A process according to claim 8, wherein the fluoroalkylsilane is in an amount of from 20 moles to 200 moles, per mol of the dimethyl silicone.

10. A process according to claim 5, wherein the silica precursor sol is prepared by subjecting an alkoxysilane to hydrolysis and polycondensation.

11. A process according to claim 5, wherein the silica precursor sol contains water and an acid catalyst.

12. A process for producing an article superior in making a waterdrop slip down a surface of the article, the process comprising steps of:
(a) subjecting an alkoxysilane to hydrolysis and polycondensation, thereby preparing a silica precursor sol;
(b) subjecting an alkoxy-group-terminated dimethyl silicone represented by the general formula [1] and a fluoroalkylsilane represented by the general formula [2] to hydrolysis and polycondensation, thereby preparing a polycondensation product;
(c) mixing the silica precursor sol with the polycondensation product, thereby preparing a coating solution; and
(d) applying the coating solution to a substrate,

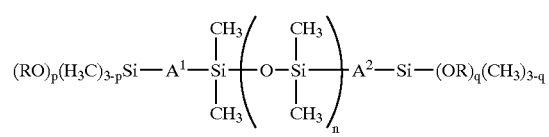

[1]

where each of $A^1$ and $A^2$ is independently a bivalent hydrocarbon group, —$(CH_2)_i$—NH—COO— group, where i is an integer of from 0 to 9, or oxygen; R is a monovalent hydrocarbon group; n is an integer of 2,000 or less and represents an average degree of polymerization; each of p and q is independently an integer of from 0 to 3; and a total of p and q is 3 or greater, $B(CF_2)_rCH_2CH_2Si(CH_3)_{3-s}X_s$ [2]

where B represents —$CF_3$ group or —$CH_2CH_2Si(CH_3)_{3-t}Y_t$ group, where Y represents a hydrolysable group and t is an integer of from 1 to 3, X represents a hydrolysable group; r is an integer of from 0 to 12; and s is an integer of from 1 to 3.

13. A process according to claim 12, wherein a precursory film formed by the step (d) is heated at a temperature of from 80° C. to 600° C. into a functional film of the article.

14. A process according to claim 12, wherein n of the general formula [1] is from 5 to 1,000.

15. A process according to claim 12, wherein the fluoroalkylsilane is in an amount of from 3 wt % to 20 wt %, based on the total weight of a silica that is to be produced from the silica precursor sol.

16. A process according to claim 15, wherein the fluoroalkylsilane is in an amount of from 20 moles to 200 moles, per mol of the dimethyl silicone.

* * * * *